United States Patent [19]

Ferris

[11] 4,079,798
[45] Mar. 21, 1978

[54] LOAD-SHARING UNIT FOR LOAD-CARRYING VEHICLES

[76] Inventor: Tom Ferris, P.O. Box 16066, Houston, Tex. 77022

[21] Appl. No.: 714,795

[22] Filed: Aug. 16, 1976

[51] Int. Cl.$^2$ ............................................. B62D 61/12
[52] U.S. Cl. .............................. 180/24.02; 280/405 R; 280/767
[58] Field of Search .................. 180/24.02; 280/81 R, 280/81 A, 405 R, 405 B, 767; 259/161, 171, 172, 173, 177 R

[56] References Cited

U.S. PATENT DOCUMENTS

| | | | |
|---|---|---|---|
| 2,280,327 | 4/1942 | Ware | 280/767 X |
| 3,112,100 | 11/1963 | Prichard | 259/161 |
| 3,161,418 | 12/1964 | Brennan | 280/81 R |
| 3,191,961 | 6/1965 | Brennan | 280/81 R |
| 3,246,884 | 4/1966 | Prichard | 259/161 |
| 3,430,931 | 4/1969 | Desko | 259/178 |
| 3,526,392 | 9/1970 | Buelow | 259/148 |
| 3,610,653 | 10/1971 | Derrwaldt | 280/81 R |
| 3,685,853 | 8/1972 | Goldsmith | 280/81 R |
| 3,746,367 | 7/1973 | Johannsen | 280/301 |

Primary Examiner—Joseph F. Peters, Jr.
Assistant Examiner—R. Schrecengost
Attorney, Agent, or Firm—Pravel, Wilson & Gambrell

[57] ABSTRACT

Heavy load-carrying vehicles such as concrete trucks occasionally require the temporary addition of extra load-carrying wheels in order to reduce load concentrations transmitted to highways to within allowable limits as set by statute and/or regulatory agencies in various states. This invention is directed to a load-carrying unit adapted for attachment to the frame of a heavy load-carrying vehicle such as a concrete truck or the like for mounting outside of both sides of the frame thereof for movement between retracted and load-sharing positions. The load-carrying unit includes first and second wheel assemblies which are movable between the retracted and load-sharing positions independently of each other, each wheel assembly including wheels mounted for rolling engagement with the highway and for rotation about an approximately vertical axis located forwardly of the wheels.

1 Claim, 4 Drawing Figures

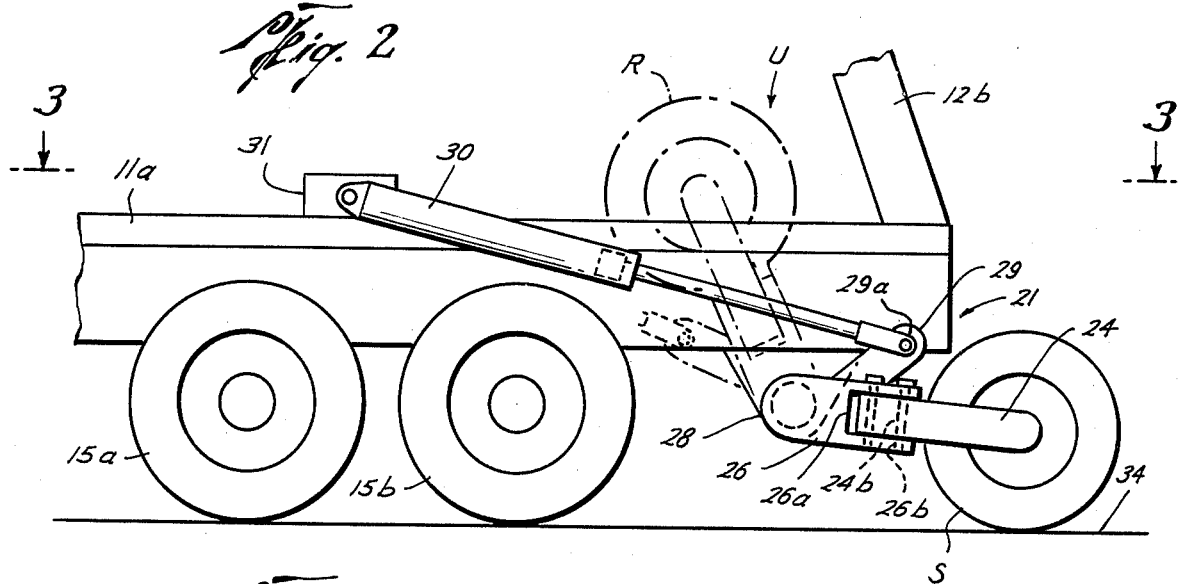
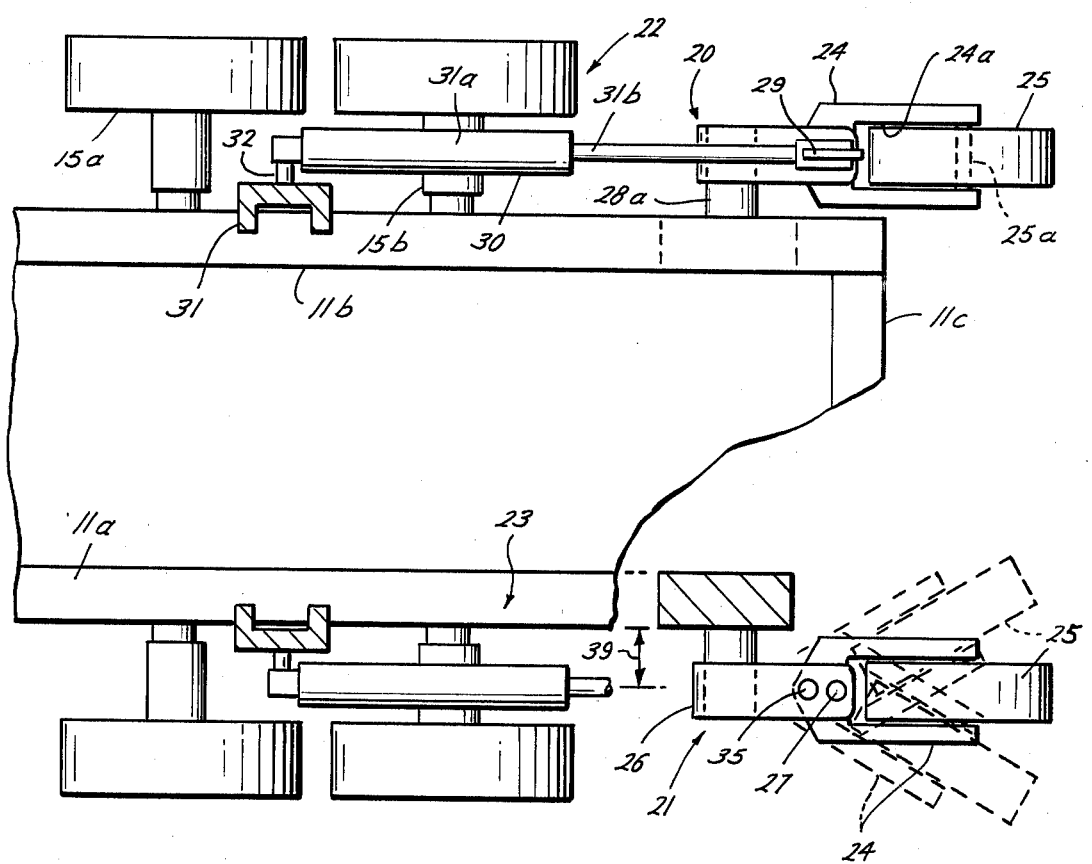

LOAD-SHARING UNIT FOR LOAD-CARRYING VEHICLES

BACKGROUND OF THE INVENTION

The field of this invention is auxiliary wheel unit for trucks such as concrete trucks which carry extremely heavy loads.

Various state statutes and/or regulatory agencies have promulgated regulations which limit the load per tire or per axle for trucks of various types on streets and highways. Concrete trucks are one type of heavy-duty trucks which generally are subject to such regulations. It is not unusual for a concrete truck with a full load of wet concrete to exceed the regulations in some states regarding the load per tire or per axle. One known method for decreasing the load per tire on a heavy loaded concrete truck is to add additional tires to absorb some of the weight of the load. U.S. Pat. No. 3,704,896, invented by Buelow, illustrates a concrete truck mixer having a concentrated load and including conventional forward steering wheels and rear drive wheels; the concrete truck mixer is provided with additional wheels mounted on an auxiliary axle below the frame of the truck. The auxiliary axle has mounted at each end thereof tires which are interconnected by a tie rod so that the tires are joined for the purposes of rotation. The tires are mounted on the axle for turning purposes by means of king pins which rotate the tires about a vertical axis at approximately the center of the wheels. The axle assembly of the Buelow U.S. Pat. No. 3,704,896 includes hydraulic means for raising and lowering the axle assembly and air bags are provided to provide auxiliary support to the truck through the wheels and axle. In at least some designs for concrete trucks, the location of an axle such as illustrated in the Buelow U.S. Pat. No. 3,704,896 is a hindrance to the raising and lowering of the auxiliary wheel assembly due to interference between the axle and the inclined concrete transfer chute mounted at the rear of the vehicle. Further, rotation of the wheels about a vertical axis substantially running through the center of the tire such as shown in Buelow U.S. Pat. No. 3,704,896 may cause undesirable wear on the tires.

U.S. Pat. No. 3,317,193 also invented by Buelow discloses another version of a wheel assembly where several transverse supports are provided between each side of the wheel assembly. Buelow U.S. Pat. No. 3,317,193 attempts to eliminate any problem with interference between the wheel assembly and the inclined chute by making the chute retractable. U.S. Pat. No. 3,246,884 invented by Prichard et al. discloses a hinged axle assembly which serves to mount auxiliary wheels at a substantial distance from the main frame of the concrete truck and axially mounts the inclined chute with the auxiliary wheels to evidently prevent interference between the wheel assembly and the inclined chute. U.S. Pat. No. 3,497,049 invented by Duecy discloses an auxiliary wheel assembly which is mounted directly behind the truck with the wheels being joined substantially close together, the principal functions of the wheel assembly to distribute axle load and provide a balancing means to balance against a shifting side load. U.S. Pat. No. 3,912,293 of Harbers, discloses an auxiliary wheel assembly which is double hinged in order to retract underneath the chute in order to avoid the interference between the axles thereof and the inclined chute. Other patents which may be of interest include U.S. Pat. Nos. 3,944,190; 3,887,715; 3,658,303; and 3,612,491.

SUMMARY OF THE INVENTION

It is an object of this invention to provide a new and improved auxiliary wheel unit for reducing concentrated loads on heavy load-carrying vehicles including first and second wheel assemblies adapted for mounting on opposite sides of the frame of the vehicle such as a concrete truck or the like for independent movement with respect to each other.

It is further an object of this invention to provide a new and improved auxiliary wheel unit which mounts the wheels for independent movement between retracted and load-sharing positions and further mounts the wheels for substantially effortless turning movement in response to the turning of the truck itself.

These objects and other objects of this invention will be pointed out or made apparent as a result of the description to follow. It should be understood, however, that only the claims of this patent define the scope of the invention sought herein and that the summary of the invention just described is not intended to affect the claims in any way.

These objects and other objects of this invention are carried out by a new and improved auxiliary wheel unit adapted for mounting with the frame of a heavy, load-carrying vehicle such as a concrete truck or the like for distributing particularly heavy loads. The auxiliary wheel unit of the preferred embodiment of this invention includes first and second wheel assemblies which are mounted onto opposite sides of the frame of the heavy, load-carrying truck for independent movement between retracted and load-sharing positions. The path of movement of the wheels mounted with the wheel assemblies is entirely to the outside of the sides of the truck frame thereby preventing any interference between the structure of the load-carrying truck and the movement of the wheels.

BRIEF DESCRIPTION OF THE DRAWINGS

FIG. 2 is the side view of the auxiliary wheel unit illustrating one wheel assembly therefore in a load-sharing position in real lines and in a retracted position in scored lines;

FIG. 3 is a top view partially in section of the auxiliary wheel unit illustrating the independent action of the opposing wheel assemblies of the unit.

DESCRIPTION OF THE PREFERRED EMBODIMENT

Figure 1:
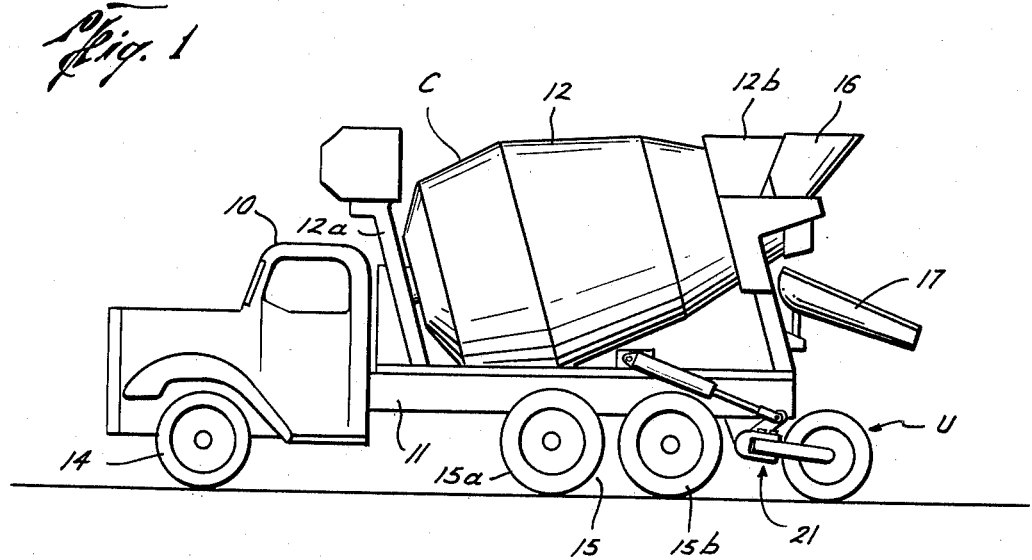
FIG. 1 is a side view of a load-carrying vehicle, namely a concrete truck, having the auxiliary wheel unit of the preferred embodiment of this invention mounted therewith.

Referring to the drawings, the letter U generally designates the auxiliary wheel unit of the preferred embodiment of this invention attached to a concrete truck C. The concrete truck C is of a conventional design and represents a load-carrying vehicle with which the auxiliary wheel unit of this invention may be utilized. The concrete truck C basically includes a cab 10 having mounted therewith a generally rectangular frame 11, as viewed from the top such as in FIG. 3. The rectangular frame 11 includes first and second side members, 11a and 11b, respectively, which are joined by welding or otherwise with a rear frame member 11c. The frame members 11a–11c support the concrete-carrying rotatable drum 12. The rotatable drum 12 is mounted for rotation at an inclined angle by support assemblies 12a and 12b, all of which are conventional in the art.

In the concrete truck C illustrated in FIG. 1, a front axle and wheel assembly 14 supports the cab 10 and a tandem axle and wheel assembly 15 including wheel and axle members 15a and 15b support the frame members 11a–11c and mixing drum 12 mounted therewith. The dual or tandem axle and wheel assembly 15 may consist of separate axle and wheel members such as 15a or 15b or may be a floating axle assembly commonly called a "bogie" in the art of concrete truck design. The concrete truck C further includes a hopper 16 which directs concrete into inclined chute 17. The inclined chute 17 is typically mounted for swinging or pivotal movement by rotatable support rod 17a. The inclined chut 17 in the embodiment illustrated in the drawings is a one-piece member. It should be understood that the inclined chute may be formed of several sections that are typically connected together. The important point is that the inclined chute 17 of the concrete truck C is typically located at the rear end thereof and, due to its extension outwardly from the rear, presents an obstacle to movement of auxiliary wheel units already described.

The auxiliary wheel unit U of the preferred embodiment of this invention includes a first wheel assembly 20 mounted on the frame side 11a and a second wheel assembly 21 mounted on the frame side 11b. A first mount means 22 mounts the first wheel assembly 20 for movement between a retracted position illustrated in scored lines and designated by the letter R in FIG. 3 and an extended, load-sharing position illustrated in real lines in all the figures of the drawings. A second mount means generally designated by the number 23 mounts the second wheel assembly 21 for exactly the same movement. The first and second wheel assemblies 20 and 21 are actually identical except for being positioned on oppositely positioned frame members 11a and 11b, respectively. Similarly, the first and second mount means 22 and 23 are exactly the same in structure, the only difference being the positioning of the first mount means on the frame member 11a and the positioning of the second mount means on the frame member 11b. Therefore, the same numbers and letters will be used to describe the wheel assemblies 20 and 21 and the wheel assembly mount means 22 and 23, it being understood that the only differences between the opposing wheel assemblies 20 and 21 and mount means 22 and 23 is one of position on opposite sides of the truck frame members 11a and 11b.

The wheel assemblies 20 and 21 include a wheel mount means in the form of frame support member 24. The frame support member 24 has a general U-shaped configuration as viewed in FIG. 3 and thus includes a slot 24a for receiving wheel 25. The wheel 25 is mounted for rotation about a horizontal hub 25a in any manner known in such art.

The frame support member 24 has an opening 24b at the forward end thereof and is adapted to fit within a recess 26a in connector link 26. An opening 26b extends through opposing sides of the connector like portions forming the recess 26a in order to receive a connector pin 27. The connector pin 27 extends approximately vertical as viewed from the side in FIGS. 2 and 4 and mounts the wheel support frame member 24 for pivotal movement in an approximately horizontal plane. The mounting of the wheel frame support member 24 for pivotal movement or swinging movement from side-to-side in an approximately horizontal plane mounts the wheel 25 for a movement with swinging movement of the frame support member 24. In this manner, the wheel 25 is capable of being turned in response to turning of the concrete truck C without subjecting the wheel to the stress of being turned about a vertical axis through the center of the wheel, which places significant wear on the wheel not found in the mounting of the wheel 25 of this invention.

The link 26 is actually part of a motion transfer element 28 which includes the link 26 and another connector link 29 which are fixedly mounted with a support hub 28a for rotatable movement together with respect to the frame members 11a and 11b.

The link 29 is connected by a pin 29a to a fluid powered cylinder assembly 30. The fluid power cylinder assembly 30 is pivotally connected by a pin 32 to support 31 mounted on the top of frame members 11a and 11b.

The fluid powered cylinder assemblies 30 are of a conventional design and include a two-way hydraulic cylinder 31a having mounted therein a pin and rod combination 31b. The cylinder assembly 31a is pivotally attached by the pin 32 to the support 31 and the piston and rod combination 31b is attached by the pin 29a to the link 29. The application of hydraulic fluid or air under pressure, or other suitable power-conveying fluid, to the cylinder assembly operates in a known manner to cause the entire cylinder assembly 30 to expand or contract. The application of fluid power causing the cylinder assembly 30 to contract will move the frame support member 24 and wheel 25 connected therewith upwardly to a raised or retracted position; and, expansion of the cylinder assembly 30 will move the frame support member 24 and wheel 25 downwardly into engagement with road surface 34 so that the wheels 25 share in the distribution of the load in the drum 12.

Whenever the frame support member 24 and wheel 25 of each wheel assembly 20 and 21 is moved upwardly to the retracted position, the frame support members 24 are locked against movement from side to side as allowed by the pivotal mounting pin 27. The locking of the frame support member 24 and wheel 25 of each wheel assembly 20 and 21 against pivotal movement is provided by a locking pin 35 which extends through aligned openings in the end portions of the frame support member 24 forming recess 24a and the connecting link 26. The aligned openings receiving the pin 35 are positioned adjacent to the openings receiving the pin 27 and lock the wheels 25 against side-to-side movement whenever desired, such as when the wheels 25 are being raised to the retracted position.

In operation and use of the auxiliary wheel unit U of this invention, each of the wheels 25 can be moved between the retracted and load-sharing positions without interfering with the inclined chute 17 or any other apparatus mounted on the rear of the concrete truck C. Each of the wheels 25 is mounted a distance 39 to the outside of the frame members 11a and 11b to provide for movement of the wheels 25 in an arcuate path between the retracted and load-sharing positions outside of the frame 11 and away from equipment mounted on the rear of the truck C. The mounting of the wheels 25 to trail the truck C without causing unnecessary wear to the wheels. This is provided by placing the approximatey vertical pivot point defined by pin 27 in front of the wheels 25 so that the wheels 25 actually move with the pivoting frame support members 24.

Figure 4:
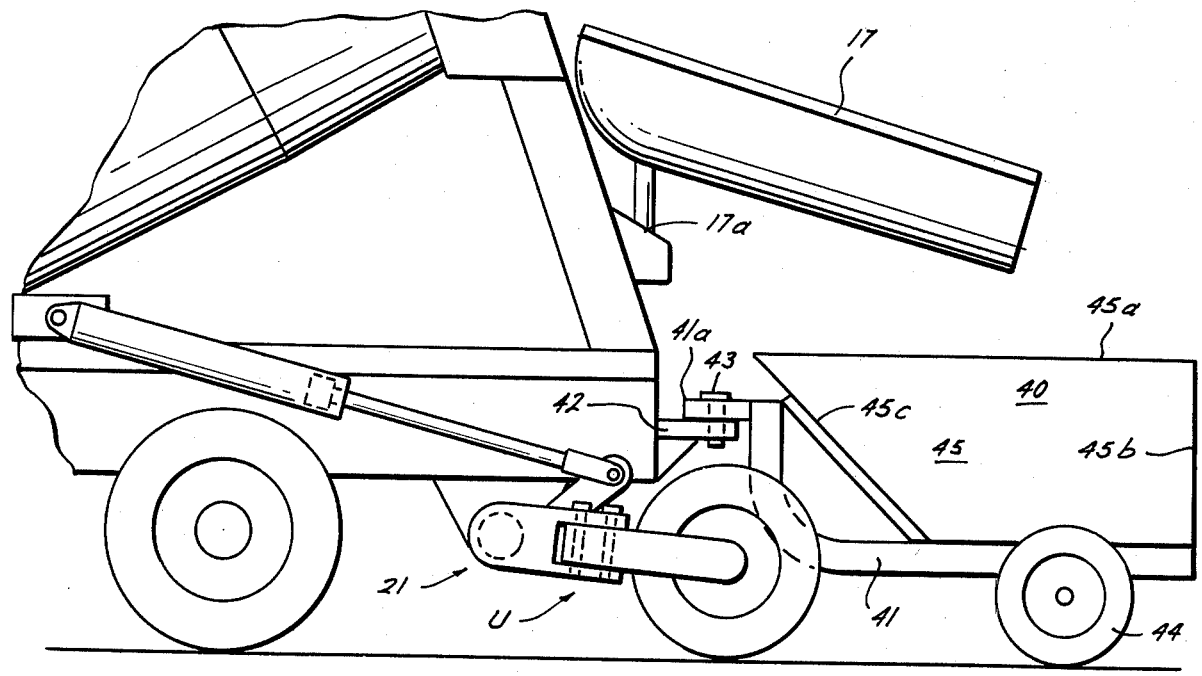
FIG. 4 is a side view of a concrete truck having the auxiliary wheel unit mounted thereon and in addition having an auxiliary cart mounted at the rear of the vehicle.

FIG. 4 illustrates an additinl feature of this invention which may be used with the auxiliary wheel unit U. A mobile cart 40 is mounted onto the rear frame member 11c in a position underneath the inclined chute 17 in order to receive residual concrete washed out of the inclined chute 17 after use. The cart 40 includes an approximately L-shaped frame 41 as viewed from the side; the frame 41 terminates in lug portion 41a. The lug portion 41a includes an opening which is alignable with a rearwardly extending frame support lug 42 to receive a connecting pin 43 so that the cart 40 may swing from side-to-side and easily trail the concrete truck C. The frame 41 mounts wheels 44 on either side thereof in any known manner and supports a container portion 45. The container portion 45 includes opposing side walls 45a which are attached by suitable means such as welding to an end vertical wall 45b. An inclined front wall 45c extends between the edges of the side members 45a. The wall members 45a-45c cooperate to provide a container that is open at the top to receive such concrete residue. Thus after use of the inclined chute 17, any residual concrete remaining therein can be washed out of the chute directly into the container portion 45 for disposal at a proper location later. This prevents deliverate or inadvertent dropping of the concrete in undesirable places such as on existing streets. The cart 40 may also carry any type of building supplies which can fit therein that is desired.

The foregoing disclosure and description of the invention are illustrative and explanatory thereof, and various changes in the size, shape and materials as well as in the details of the illustrated construction may be made without departing from the spirit of the invention.

For example, the support arm 24 is described as having slot 24a. The support arm 24 may have other configurations such as a configuration that supports wheel 25 on one side only. Also, a second wheel may be supported by each arm 24 so that the auxiliary unit U adds four wheels to the truck C.

I claim:

1. An auxiliary wheel unit apparatus adapted for mounting with the frame of a transit mix vehicle having a rotatable concrete mixer drum with a movable rearwardly extending discharge chute, said apparatus for distributing a portion of the load of the transit mix vehicle to the auxiliary wheel unit when desired, said apparatus including:

first and second wheel assemblies, each of said wheel assemblies including a mounted rotatable wheel for rolling engagement with the support surface for the vehicle and a wheel mount means for holding said wheel in a rotatable condition;

first and second mounting means for mounting said first and second wheel assemblies on opposite sides of the vehicle frame including a motion transfer means having a pivotally connected link for enabling movement of the associated rotatable wheel assembly between retracted and load-sharing positions located outside of the opposite sides of the vehicle frame independently of the position of the other wheel assembly;

each of said rotatable wheel assembly in the load sharing position existing rearwardly of said vehicle and in the retracted position positioned forwardly of the point of rotation of said pivotally connected link to clear the rearwardly extending discharge chute;

each of said first and second mounting means having a fluid actuated power cylinder being expandable and contractable by the application of fluid under pressure;

means for mounting each of said power cylinders with one side of the frame of the vehicle;

means for mounting the other end of each of said power cylinders with said pivotally connected links for moving said wheel assemblies between retracted and load-sharing positions by the application of fluid under pressure to the power cylinder connected with said pivotal links;

each of said first and second mounting means having connector means for mounting at one end thereof one of said wheel mount means and connecting at another end thereof with said pivotally connected link, said connection between said connector means and said pivotally connected link having a pivotal connection with a vertical axis when said wheel assembly is in the load-sharing position to enable said rotatable wheel to trail the vehicle to reduce tire wear; and means for releasably locking said connector means against pivotal movement relative to said pivotally connected links when desired.

* * * * *